United States Patent
Hsieh et al.

(10) Patent No.: US 11,172,238 B1
(45) Date of Patent: Nov. 9, 2021

(54) MULTIPLE VIEW STREAMING

(71) Applicant: VisualOn, Inc., San Jose, CA (US)

(72) Inventors: Cheng-Ta Hsieh, San Jose, CA (US); Hyoheon Hong, Seongnam (KR); Ming-Mao Chiang, Zhubei (TW)

(73) Assignee: VisualOn, Inc., Campbell, CA (US)

( * ) Notice: Subject to any disclaimer, the term of this patent is extended or adjusted under 35 U.S.C. 154(b) by 30 days.

(21) Appl. No.: 16/782,897

(22) Filed: Feb. 5, 2020

(51) Int. Cl.
*H04N 21/218* (2011.01)
*H04N 21/2662* (2011.01)
*H04N 21/845* (2011.01)

(52) U.S. Cl.
CPC ... *H04N 21/21805* (2013.01); *H04N 21/2662* (2013.01); *H04N 21/8455* (2013.01)

(58) Field of Classification Search
CPC ......... H04N 21/21805; H04N 21/2662; H04N 21/8455
USPC .................................................. 375/240.13
See application file for complete search history.

(56) References Cited

U.S. PATENT DOCUMENTS

| | | | |
|---|---|---|---|
| 2006/0026294 A1* | 2/2006 | Virdi | H04N 21/658 709/232 |
| 2011/0080940 A1* | 4/2011 | Bocharov | H04N 21/4348 375/240.01 |
| 2020/0204841 A1* | 6/2020 | Van Brandenburg | H04N 21/21805 |

* cited by examiner

*Primary Examiner* — Matthew K Kwan
(74) *Attorney, Agent, or Firm* — Van Pelt, Yi & James LLP (57) ABSTRACT

A system for providing video playback includes an interface and a processor. The interface is configured to receive a desired video playback request and receive a video content source switching request from a first video content source to a second video content source. The processor is configured to generate a not-all-I-frame first stream for the first video content source, generate an all-I-frame second stream and a not-all-I-frame second stream for the second video content source, switch from the not-all-I-frame first stream for the first video content source to the all-I-frame second stream for the second video content source, and switch from the all-I-frame second stream for the second video content source to the not-all-I-frame second stream for the second video content source on a next I-frame occurrence in the not-all-I-frame second stream for the second video content source.

19 Claims, 11 Drawing Sheets

MULTIPLE VIEW STREAMING

BACKGROUND OF THE INVENTION

Traditionally a video provider service provides a single video stream for a given content. For certain types of content (e.g., sports, performance, etc.) it is desirable to view the content from multiple angles. A traditional video production system may have a live video editor for selecting a video source of a set of video sources as the content progresses. For example, a live video editor picks which camera of a large set of cameras filming a baseball game to broadcast. In the modern era of video streaming, it is possible to provide the viewer the ability to switch video streams on the fly as the content is watched. Industry-standard video compression techniques make this challenging, however. For a live event it is required to switch the video streams with minimal delay. Compression techniques utilizing segmentation can only start displaying a stream at the beginning of a segment, typically every few seconds. These video compression techniques make streaming feasible but hinder fast switching.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for providing video playback is disclosed. The system comprises an interface and a processor. The interface is configured to receive a desired video playback request and receive a video content source switching request from a first video content source to a second video content source. The processor is configured to generate a not-all-I-frame first stream for the first video content source, generate an all-I-frame second stream and a not-all-I-frame second stream for the second video content source, switch from the not-all-I-frame first stream for the first video content source to the all-I-frame second stream for the second video content source, and switch from the all-I-frame second stream for the second video content source to the not-all-I-frame second stream for the second video content source on a next I-frame occurrence in the not-all-I-frame second stream for the second video content source.

A system for providing video playback comprises a system for streaming multiple views of either live or prerecorded video. A control system streams video to a set of video playback devices, the video comprising a set of video content sources associated with a set of views (e.g., a set of angles on a baseball game or a theater performance). When an indication to change a view is received from one of the video playback devices the control system changes the video stream provided. For each video content source, a video encoder of the control system creates a set of video streams corresponding to the video content source. The set of video streams comprises a segmented video stream (e.g., a not-all-I-frame video stream) and a non-segmented video stream (e.g., an all-I-frame video stream). A segmented video stream comprises a set of segments, each segment beginning with an I frame (e.g., a frame comprising full image data) and continuing with a set of P frames (e.g., frames determined based at least in part on delta values from a previous frame). To increase compression, new segments are started infrequently (e.g., every few seconds). A video playback device can only begin displaying a stream with an I frame, for example, at the beginning of a segment for a segmented video stream. When the indication to change from a first video content source to a second video content source is received, the control system switches from providing the not-all-I-frame stream for the first video content source to providing the all-I-frame stream for the second video content source. When a new segment begins, the control system switches from providing the all-I-frame stream for the second video content source to providing the not-all-I-frame stream for the second video content source. This allows the switch to happen within a single frame while only providing the all-I-frame stream until the beginning of the next segment.

In some embodiments, the video encoder of the control system creates multiple bit rate versions of both the all-I-frame stream and the not-all-I-frame-stream. For example, the video encoder creates a high bit rate all-I-frame stream, a low bit rate all-I-frame stream, a high bit rate not-all-I-frame stream, and a low bit rate not-all-I-frame stream. For example, a high bit rate stream comprises frames of higher resolution and a low bit rate stream comprises streams of lower resolution. The control system is able to switch between providing high and low bit rate streams in the same manner as switching between a first video content source and a second video content source. The system for multiple view streaming improves the computer system by allowing the switching of streams (e.g., either between a first content source and a second content source, or between a first bit rate and a second bit rate) with minimal lag, while preserving the data compression benefits of using a segmented stream.

Figure 1:
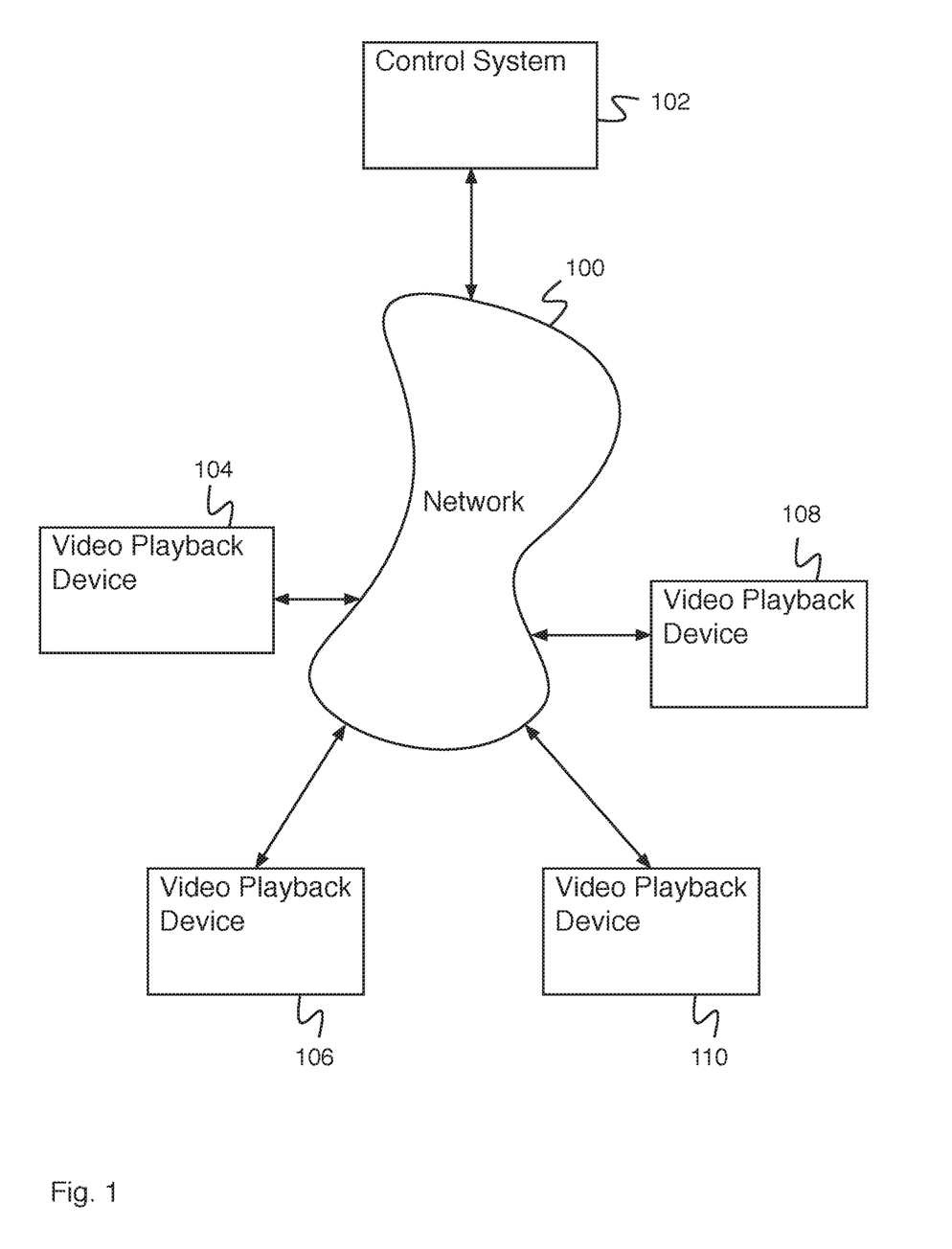
FIG. 1 is a block diagram illustrating an embodiment of a network system for a system for multiple view streaming.

FIG. 1 is a block diagram illustrating an embodiment of a network system for a system for multiple view streaming. In some embodiments, the network system of FIG. 1 comprises a network system for a system for providing video playback. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Control system 102, video playback device 104, video playback device 106, video playback device 108, and video playback device 110 communicate via network 100.

Control system 102 comprises a control system for controlling video playback on a plurality of video playback devices, e.g., control system 102 comprises a control system for providing synchronized video to video playback device 104, video playback device 106, video playback device 108, and video playback device 110. For example, control system 102 comprises a system for providing video playback, comprising an interface configured to receive a desired video playback request and receive a video content source switching request from a first video content source to a second video content source, and a processor configured to generate a not-all-I-frame first stream for the first video content source, generate an all-I-frame second stream and a not-all-I-frame second stream for the second video content source, switch from the not-all-I-frame first stream for the first video content source to the all-I-frame second stream for the second video content source, and switch from the all-I-frame second stream for the second video content source to the not-all-I-frame second stream for the second video content source on a next I-frame occurrence in the not-all-I-frame second stream for the second video content source.

Figure 2:
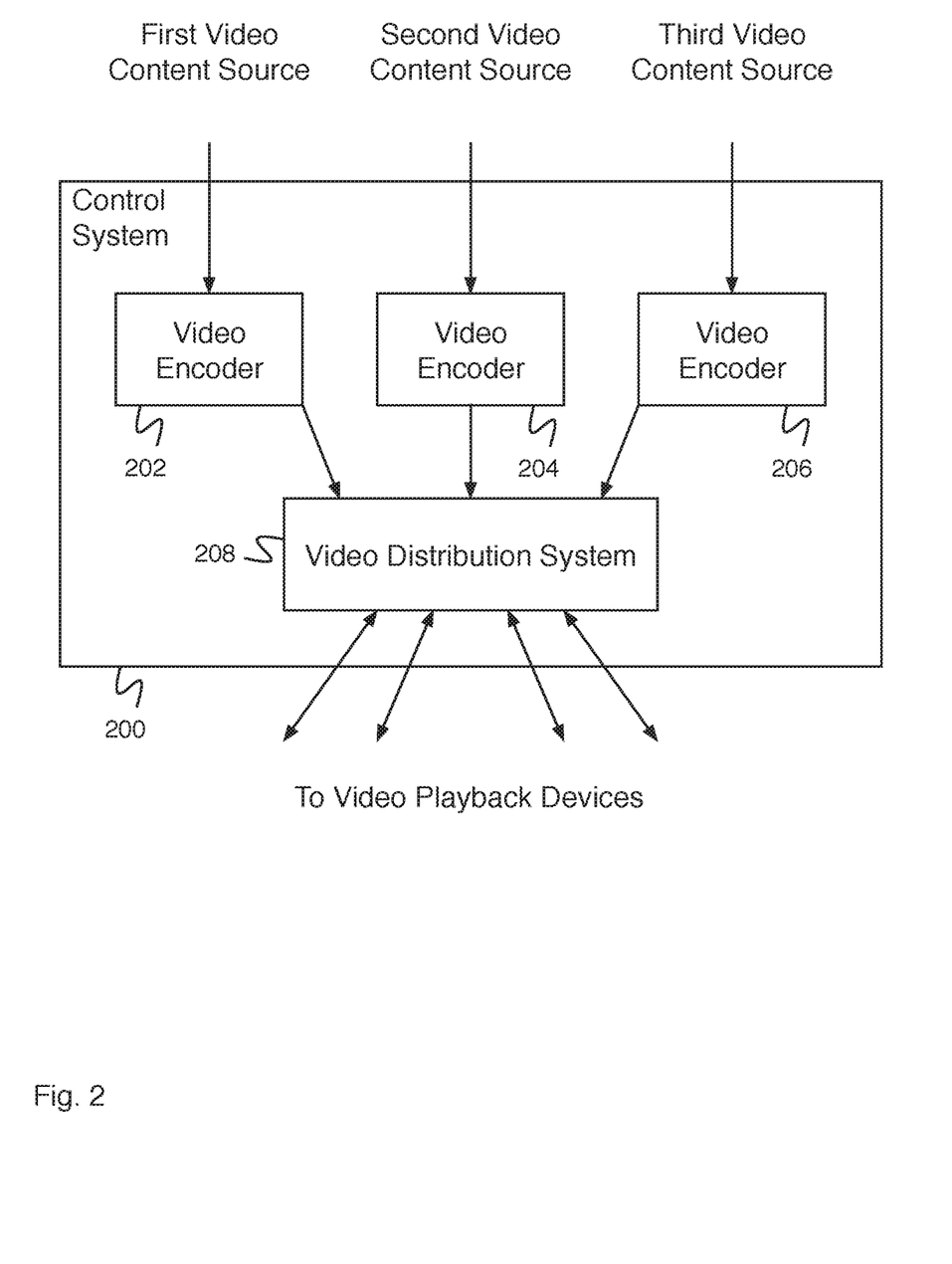
FIG. 2 is a block diagram illustrating an embodiment of a control system.

FIG. 2 is a block diagram illustrating an embodiment of a control system. In some embodiments, control system 200 of FIG. 2 comprises control system 102 of FIG. 1. In the example shown, control system 200 comprises video encoder 202 receiving video data from a first video content source, video encoder 204 receiving video data from a second video content source, and video encoder 206 receiving video data from a third video content source. Each video encoder creates a set of streams from the video content source it receives data from. For example, a video encoder creates an all-I-frame stream and a not-all-I-frame stream, or the video encoder creates a high bit rate all-I-frame stream, a low bit rate all-I-frame stream, a high bit rate not-all-I-frame stream, and a low bit rate not-all-I-frame stream. Video encoder 202, video encoder 204, and video encoder 206 provide generated streams to video distribution system 208. Video distribution system 208 comprises a system for providing video streams to video playback devices (e.g., video playback device 104 of FIG. 1, video playback device 106 of FIG. 1, video playback device 108 of FIG. 1, and video playback device 110 of FIG. 1) and receiving video playback requests from video playback devices (e.g., requests to start video, stop video switch video streams, etc.).

For example, video encoder 202 comprises a system configured to generate a not-all-I-frame first stream for a first video content source, video encoder 204 comprises a system configured to generate an all-I-frame second stream and a not-all-I-frame second stream for a second video content source, and video distribution system 208 comprises an interface configured to receive a desired video playback request and receive a video content source switching request from a first video content source to a second video content source, and a processor configured to switch from the not-all-I-frame first stream for the first video content source to the all-I-frame second stream for the second video content source, and switch from the all-I-frame second stream for the second video content source to the not-all-I-frame second stream for the second video content source on a next I-frame occurrence in the not-all-I-frame second stream for the second video content source. In some embodiments, the processor of video distribution system 208 implements video encoder 202, video encoder 204, and video encoder 206. In various embodiments, control system 200 comprises a plurality of processors, a plurality of systems, a plurality of cloud systems, a plurality of virtual system, or any other appropriate systems.

Figure 3:
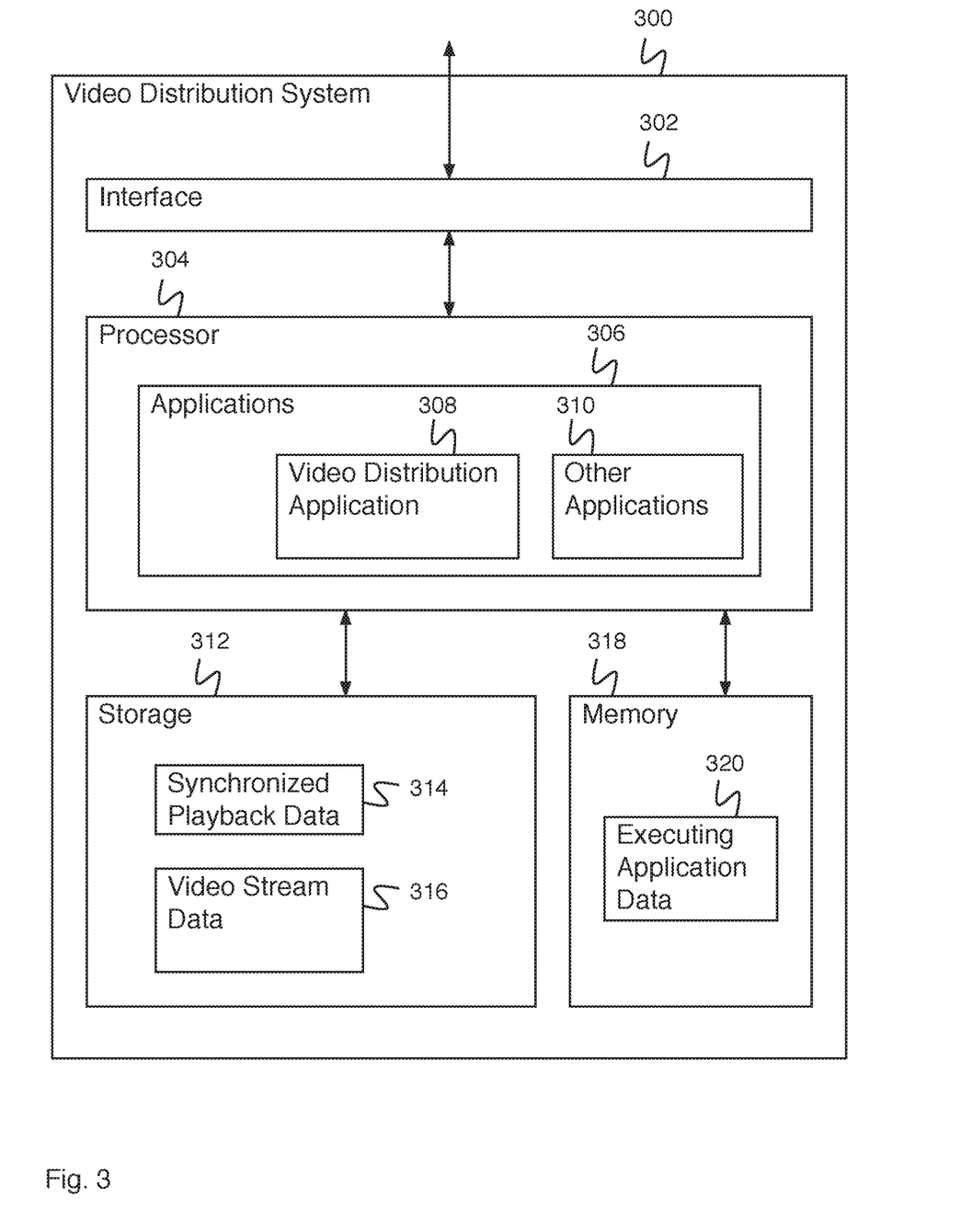
FIG. 3 is a block diagram illustrating an embodiment of a video distribution system.

FIG. 3 is a block diagram illustrating an embodiment of a video distribution system. In some embodiments, video distribution system 300 comprises video distribution system 208 of FIG. 2. In the example shown, video distribution system 300 comprises interface 302. For example, interface 302 comprises an interface for receiving video streams, receiving a desired video playback request, receiving a request to switch streams, etc. Processor 304 comprises a processor for executing applications 306. Applications 306 comprises video distribution application 308 and other applications 310. For example, video distribution application 308 comprises an application configured to switch from a not-all-I-frame first stream for a first video content source to an all-I-frame second stream for a second video content source, and switch from the all-I-frame second stream for the second video content source to a not-all-I-frame second stream for the second video content source on a next I-frame occurrence in the not-all-I-frame second stream for the second video content source. Other applications 310 comprise any other appropriate applications (e.g., a communications application, a data storage and retrieval application, a web browser application, a user interface application, a data analysis application, etc.). Storage 312 comprises synchronized playback data 314 (e.g., timing information from a plurality of devices, playback status information for a plurality of devices, a current video position, video layout data for a plurality of devices, etc.) and video stream data 316 (e.g., a set of video stream frames, etc.). Memory 318 comprises executing application data 320 comprising data associated with applications 306.

Figure 4:
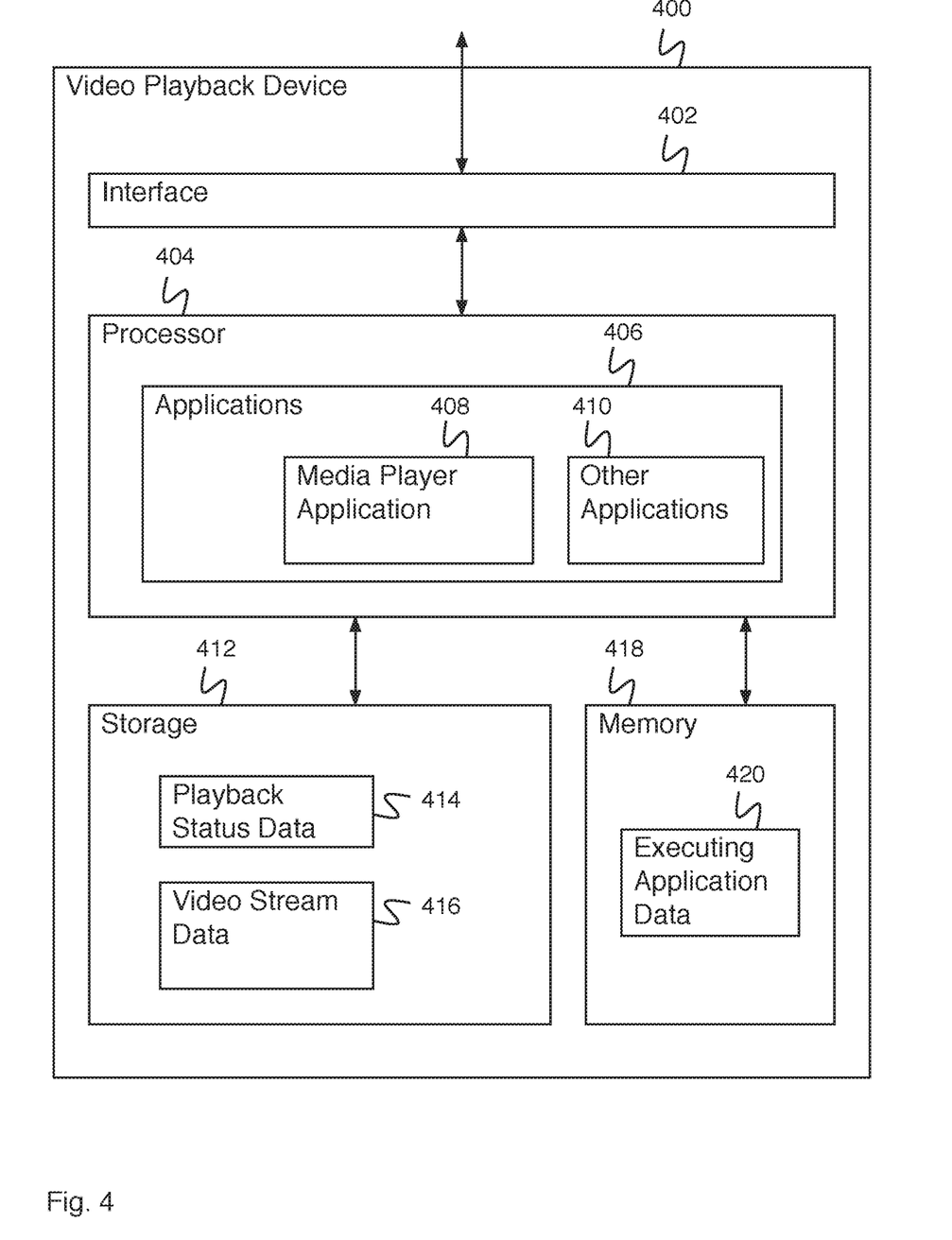
FIG. 4 is a block diagram illustrating an embodiment of a video playback device.

FIG. 4 is a block diagram illustrating an embodiment of a video playback device. In some embodiments, video playback device 400 comprises video playback device 104 of FIG. 1, video playback device 106 of FIG. 1, video playback device 108 of FIG. 1, or video playback device 110 of FIG. 1. In the example shown, video playback device 400 comprises interface 402. For example, interface 402 comprises an interface for receiving video stream data, providing a desired video playback request, providing a request to switch streams, etc. Processor 404 comprises a processor for executing applications 406. Applications 406 comprises media player application 408 and other applications 410. For example, media player application 408 comprises an application for playing a video stream (e.g., decoding a video stream, providing decoded video for display, responding to user commands, etc.). Other applications 410 comprises any other appropriate applications (e.g., a communications application, a data storage and retrieval application, a web browser application, a user interface application, a data analysis application, etc.). Storage 412 comprises playback status data 414 (e.g., a current playback position, a current playback quality, a playback lag, a number of dropped frames, etc.) and video stream data 416 (e.g., a set of video stream frames, etc.). Memory 418 comprises executing application data 420 comprising data associated with applications 406.

Figure 5:
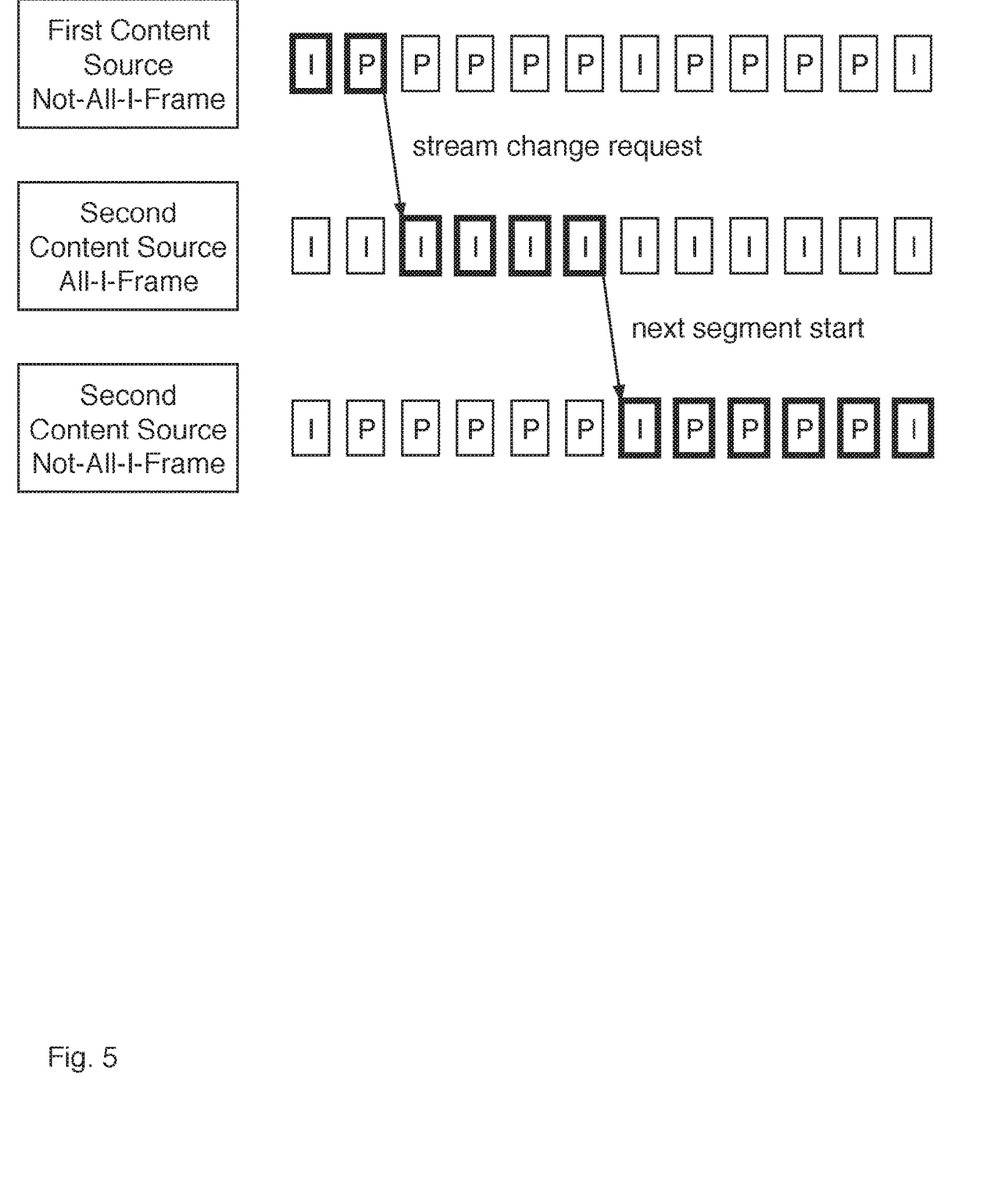
FIG. 5 is a diagram illustrating an embodiment of stream switching.

FIG. 5 is a diagram illustrating an embodiment of stream switching. In some embodiments, the stream switching of FIG. 5 is implemented by video distribution system 300 of FIG. 3. In the example shown, a not-all-I-frame (e.g., segmented) stream from a first content source, an all-I-frame stream from a second content source, and a not-all-I-frame stream from the second content source are received by the video distribution system. Video stream frames provided by the video distribution system are shown in FIG. 5 with a bold border. At the beginning of the time period shown, the video distribution system provides frames from the not-all-I-frame stream for the first content source. A stream change request from the first content source to the second content source is received, and the video distribution system immediately switches to providing frames from the all-I-frame stream for the second content source. As all frames from the all-I-frame stream are I-frames, the video playback device playing back the stream is able to display the second content source immediately. At the time of the next segment start, the video distribution system switches to providing frames from the not-all-I-frame stream for the second content source. Video playback is uninterrupted, as the switch happens at an I-frame of the not-all-I-frame stream (e.g., at the segment start). Switching from the all-I-frame stream for the second content source to the not-all-I-frame stream for the second content source returns the stream bandwidth to a typical stream bandwidth (e.g., as opposed to an all-I-frame stream bandwidth, which can be higher).

Figure 6:
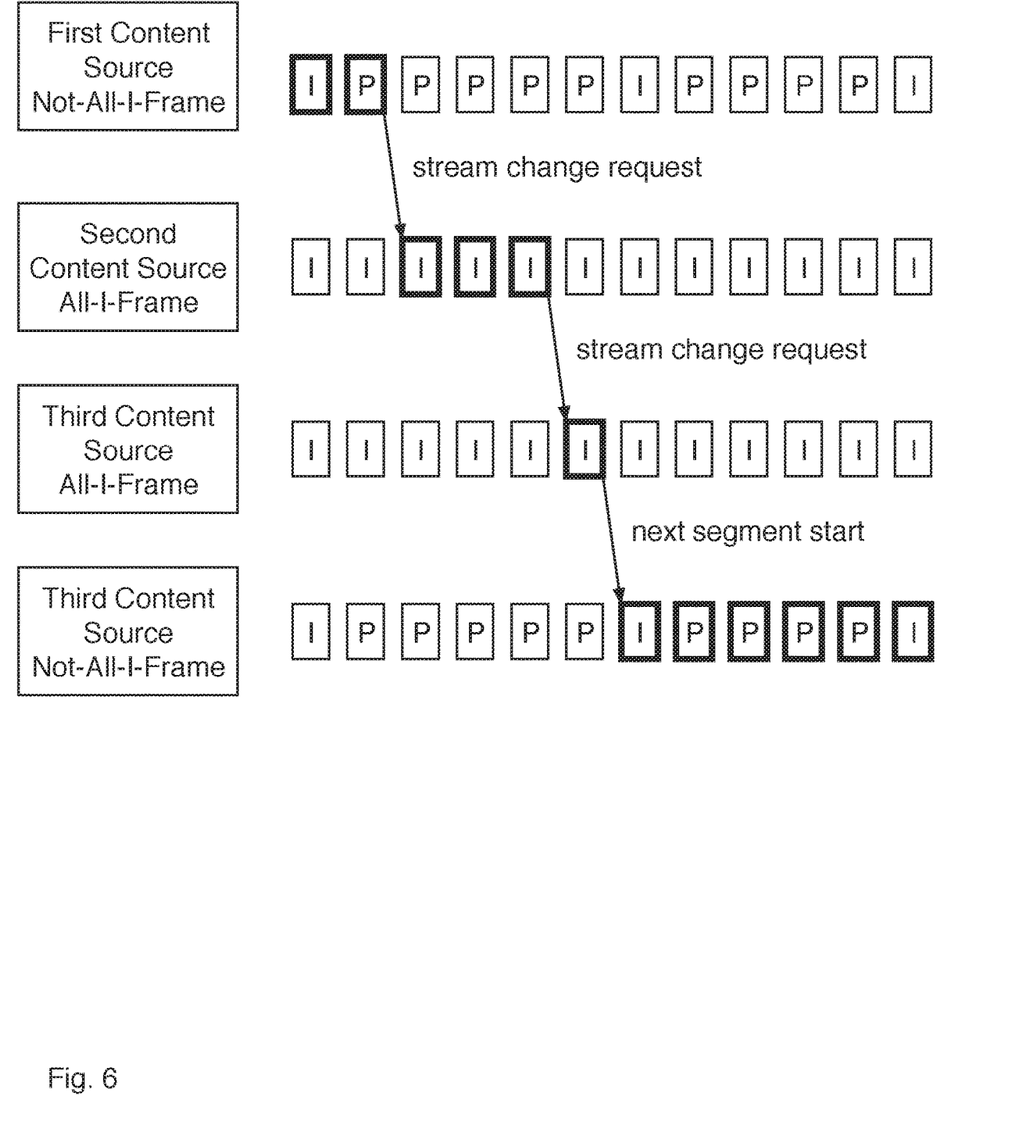
FIG. 6 is a diagram illustrating an embodiment of stream switching.

FIG. 6 is a diagram illustrating an embodiment of stream switching. In some embodiments, the stream switching of FIG. 6 is implemented by video distribution system 300 of FIG. 3. In the example shown, at least a not-all-I-frame (e.g., segmented) stream from a first content source, an all-I-frame stream from a second content source, an all-I-frame stream from a third content source, and a not-all-I-frame stream from the third content source are received by the video distribution system. Video stream frames provided by the video distribution system are shown in FIG. 6 with a bold border. At the beginning of the time period shown, the video distribution system provides frames from the not-all-I-frame stream for the first content source. A stream change request from the first content source to the second content source is received, and the video distribution system immediately switches to providing frames from the all-I-frame stream for the second content source. As all frames from the all-I-frame stream are I-frames, the video playback device playing back the stream is able to display the second content source immediately. Before the time of the next segment start, a stream change request from the second content source to the third content source is received. The video distribution system immediately switches to providing frames from the all-I-frame stream for the third content source. The video playback device playing back the stream is able to display the third content source immediately. At the time of the next segment start, the video distribution system switches to providing frames from the not-all-I-frame stream for the third content source. Video playback is uninterrupted, as the switch happens at an I-frame of the not-all-I-frame stream (e.g., at the segment start). Switching from the all-I-frame stream for the third content source to the not-all-I-frame stream for the third content source returns the stream bandwidth to a typical stream bandwidth (e.g., as opposed to an all-I-frame stream bandwidth, which can be higher).

Figure 7:
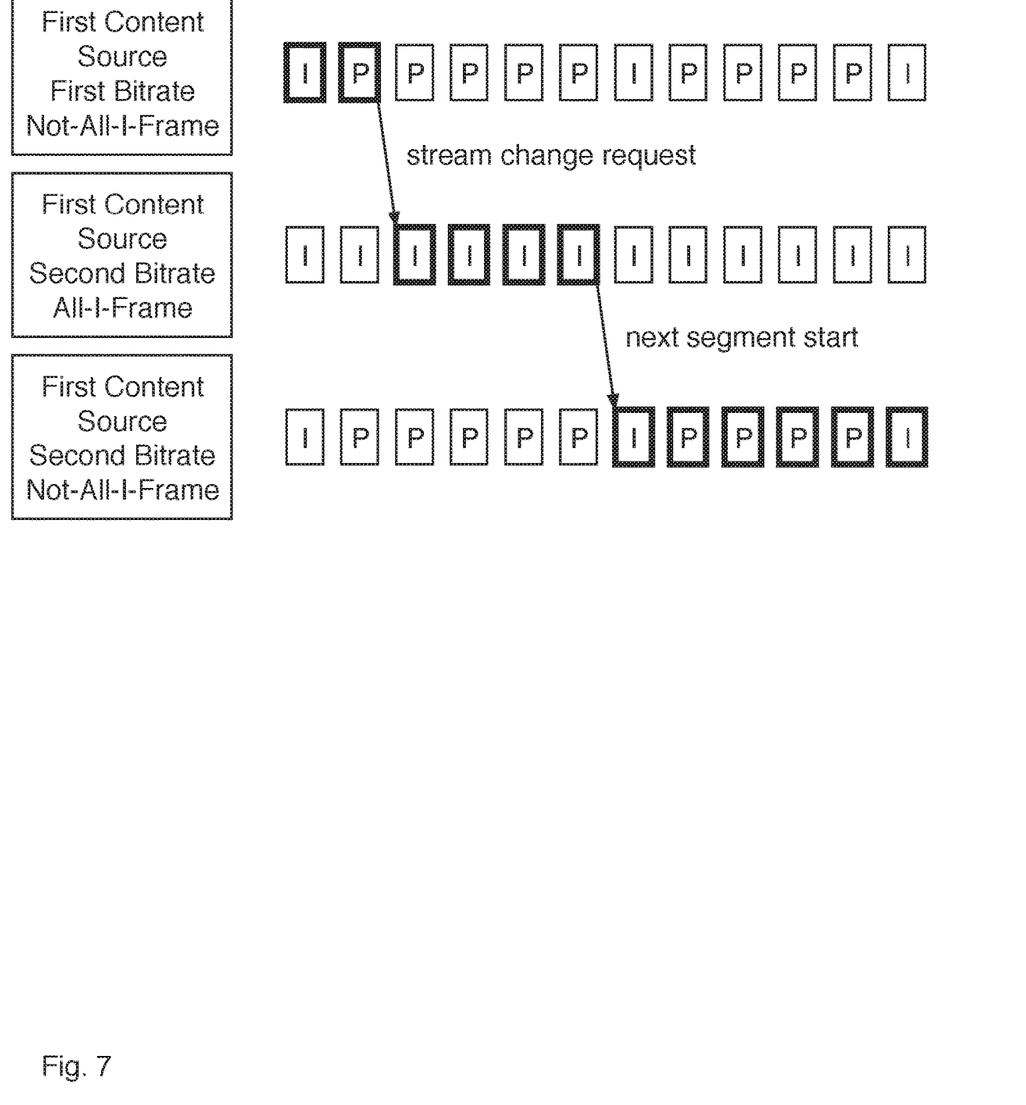
FIG. 7 is a diagram illustrating an embodiment of stream bit rate switching.

FIG. 7 is a diagram illustrating an embodiment of stream bit rate switching. In some embodiments, the stream bit rate switching of FIG. 7 is implemented by video distribution system 300 of FIG. 3. In the example shown, at least a not-all-I-frame (e.g., segmented) stream at a first bit rate from a first content source, an all-I-frame stream at a second bit rate from the first content source, and a not-all-I-frame stream at the second bit rate from the first content source are received by the video distribution system. For example, the second bit rate is higher than the first bit rate or the second bit rate is lower than the first bit rate. Video stream frames provided by the video distribution system are shown in FIG. 7 with a bold border. At the beginning of the time period shown, the video distribution system provides frames from the not-all-I-frame stream at the first bit rate for the first content source. A stream change request from the first bit rate to the second bit rate source is received, and the video distribution system immediately switches to providing frames from the all-I-frame stream at the second bit rate for the first content source. For example, the stream change request is made manually by a user or the stream change request is made automatically by a process for determining an optimum streaming bit rate. For example, a bit rate is adjusted automatically based on an indication of a frame drop rate, a rebuffering rate, or on any other appropriate factor. As all frames from the all-I-frame stream are I-frames, the video playback device playing back the stream is able to display the content at the second bit rate immediately. At the time of the next segment start, the video distribution system switches to providing frames from the not-all-I-frame stream at the second bit rate for the first content source. Video playback is uninterrupted, as the switch happens at an I-frame of the not-all-I-frame stream (e.g., at the segment start). Switching from the all-I-frame stream at the first bit rate to the not-all-I-frame stream at the second bit rate returns the stream bandwidth to a typical stream bandwidth (e.g., as opposed to an all-I-frame stream bandwidth, which can be higher).

Figure 8:
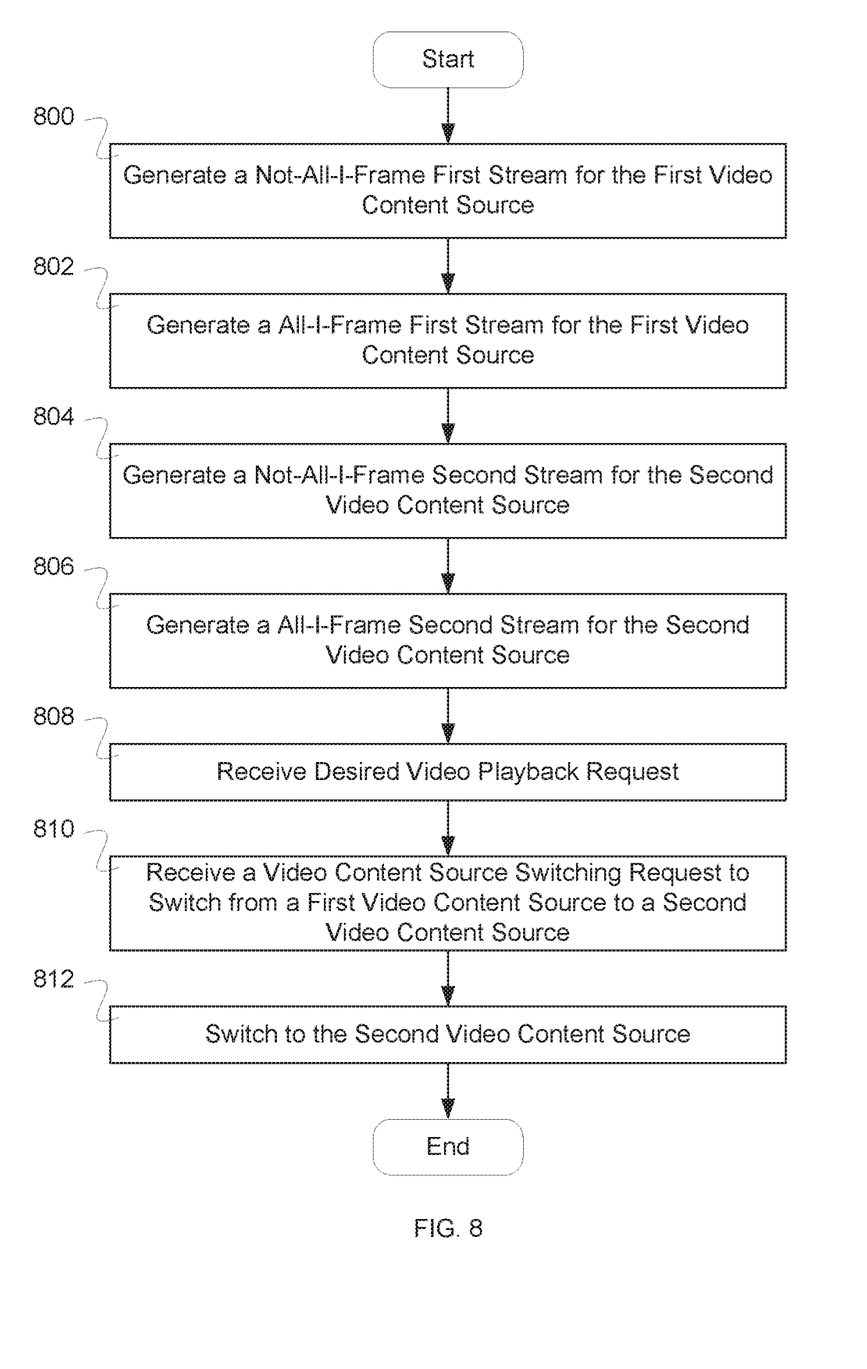
FIG. 8 is a flow diagram illustrating an embodiment of a process for providing video playback.

FIG. 8 is a flow diagram illustrating an embodiment of a process for providing video playback. In some embodiments, the process of FIG. 8 is executed by control system 102 of FIG. 1. In the example shown, in 800, a not-all-I-frame first stream is generated for a first video content source. In 802, an all-I-frame first stream is generated for the first video content source. In 804, a not-all-I-frame second stream is generated for a second video content source. In 806, an all-I-frame second stream is generated for the second video content source. For example, the first content source and the second content source comprise different views, views at different angles, views highlighting different people, different views of a live event, etc. For example, the not-all-I-frame first stream, the all-I-frame second stream, and the not-all-I-frame second stream are generated by a set of video encoders operating in parallel. In various embodiments, all video content sources are associated with a single audio content source, or each video content source is associated with a different audio content source. In 808, a desired video playback request is received. For example, the desired video playback request comprises a request for video from a first video content source. In 810, a video content source switching request to switch from a first video content source to a second video content source is received. In 812, the second video content source is switched to. For example, the process switches from current source to desired source by switching first to an all-I-frame version of the desired source encoding and then, when possible, switches to a not-all-I-frame desired source encoding.

Figure 9:
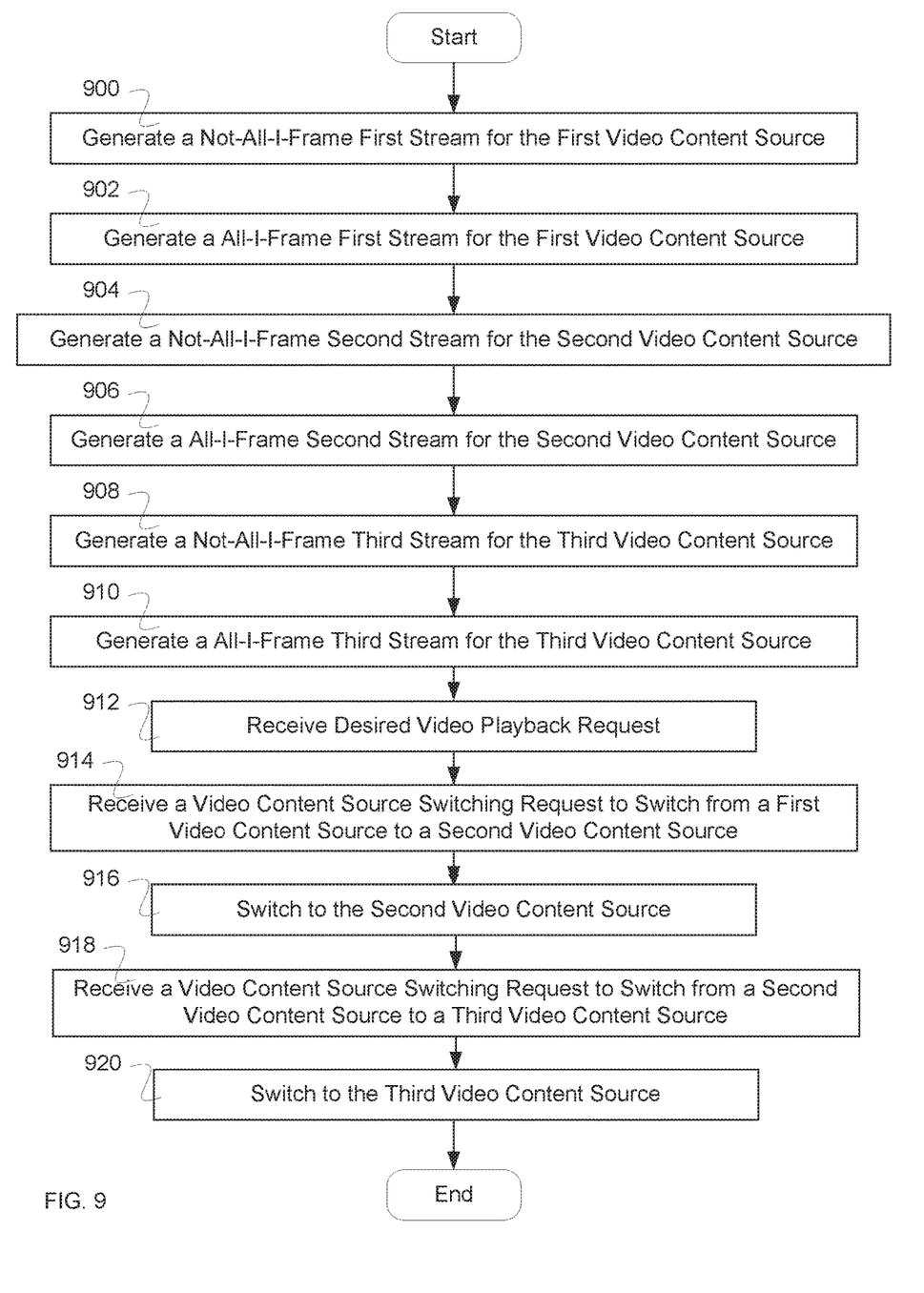
FIG. 9 is a flow diagram illustrating an embodiment of a process for providing video playback.

FIG. 9 is a flow diagram illustrating an embodiment of a process for providing video playback. In some embodiments, the process of FIG. 9 is executed by control system 102 of FIG. 1. In the example shown, in 900, a not-all-I-frame first stream is generated for a first video content source. In 902, an all-I-frame first stream is generated for the first video content source. In 804, a not-all-I-frame second stream is generated for a second video content source. In 906, an all-I-frame second stream is generated for the second video content source. In 908, a not-all-I-frame third stream is generated for a third video content source. In 910, an all-I-frame third stream is generated for the third video content source. In 912, a desired video playback request is received. For example, the desired video playback request comprises a request for video from a first video content source. In 914, a video content source switching request from a first video content source to a second video content source is received. In 916, the second video content source is switched to. For example, the process switches from current source to desired source by switching first to an all-I-frame version of the desired source encoding and then, when possible, switches to a not-all-I-frame desired source encoding. In 918, a video content source switching request from a second video content source to a third video content source is received. In 920, the third video content source is switched to. For example, the process switches from current source to desired source by switching first to an all-I-frame version of the desired source encoding and then, when possible, switches to a not-all-I-frame desired source encoding. In some embodiments, the second video content source is still using an all-I-frame source encoding.

Figure 10:
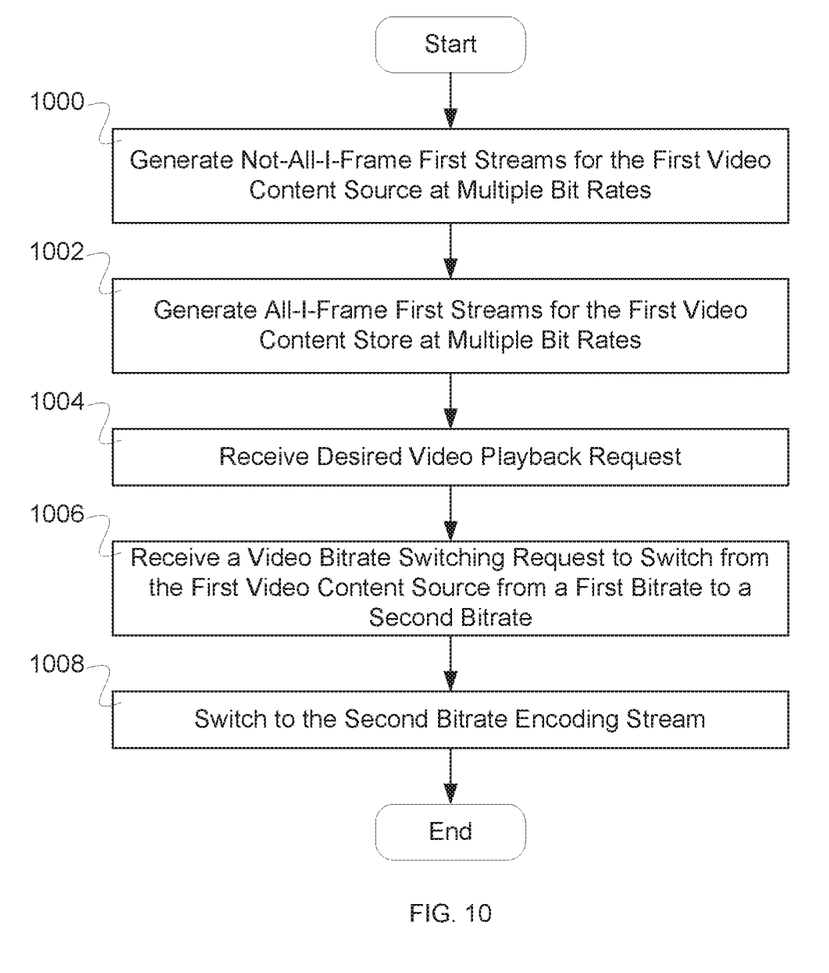
FIG. 10 is a flow diagram illustrating an embodiment of a process for providing video playback.

FIG. 10 is a flow diagram illustrating an embodiment of a process for providing video playback. In some embodiments, the process of FIG. 10 is executed by control system 102 of FIG. 1. In the example shown, in 1000, a not-all-I-frame first stream for a first video content source is generated at multiple bit rates. In 1002, an all-I-frame first stream for the first video content source is generated at multiple bit rates. In 1004, a desired video playback request is received. For example, the desired video playback request comprises a request for video from a first content source at a first bit rate. In 1006, a video bit rate switching request to switch the first video content source from a first bit rate to a second bit rate is received. In 1008, the process switches to the second bitrate encoding stream. For example, the system switches from the first bitrate encoding stream to a second bitrate encoded stream of all-I-frames and then to a second bitrate encoded stream of not-all-I-frames when appropriate.

Figure 11:
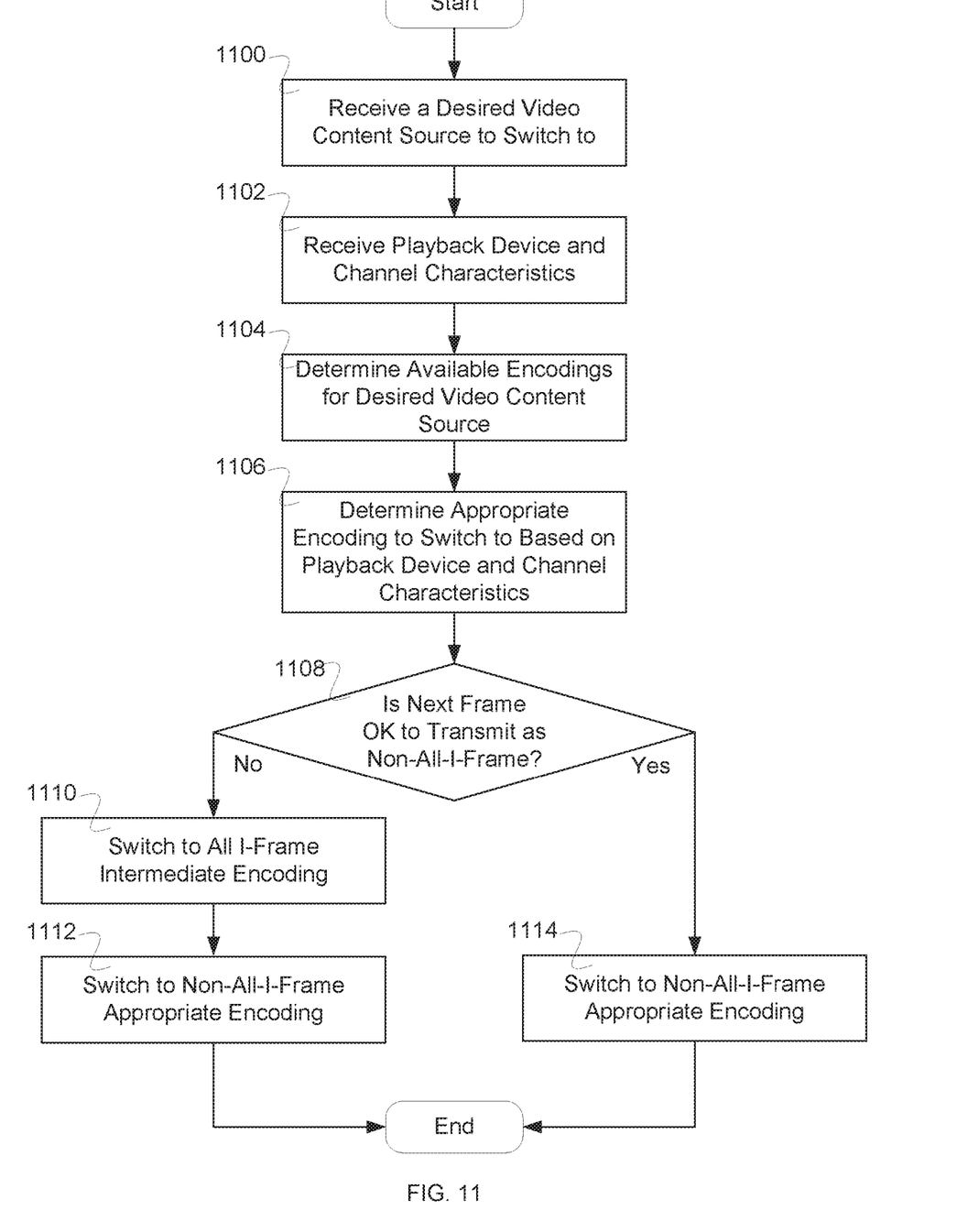
FIG. 11 is a flow diagram illustrating an embodiment of a process for switching to a desired video content source.

FIG. 11 is a flow diagram illustrating an embodiment of a process for switching to a desired video content source. In some embodiments, the process of FIG. 11 is used to implement 812 of FIG. 8, 916 or 920 of FIG. 9, or 1008 of FIG. 10. In the example shown, in 1100 a desired video content source to switch to is received. For example, a selection of a video content source and/or a video bitrate of a content source is received. In 1102, a playback device and channel characteristics are received. For example, the device ID, bit rate, resolution, and/or video content encoding currently being displayed are received. In 1104, available encodings for desired video content source are determined. For example, the all-I-frame streams and associated non-all-I-frame streams at different bit rates are determined. In 1106, an appropriate encoding to switch to is determined based on playback device and channel characteristics. For example, from the streams available, an encoding is selected to switch to (e.g., for switching from a first stream to a second stream, an all-I-frame encoding is selected so that the switch can be made rapidly and then the stream is switched to a non-all-I-frame encoding so that more efficient encoding can be selected). In 1108, it is determined whether the next frame is OK to transmit as a non-all-I-frame. For example, the appropriate encoding stream is examined to determine whether the next frame is an I-frame so that it can be determined whether a direct switch is possible (e.g., to a non-all-I-frame instead of to an all-I-frame stream and then to a non-all-I-frame). In response to determining that the next frame is OK to transmit as a non-all-I-frame, in 1114 switching to the appropriate encoding and the process ends. In response to determining that the next frame is not OK to transmit as a non-all-I-frame, in 1110 switching to an all-I-frame intermediate encoding, in 1112 switching to a non-all-I-frame appropriate encoding, and the process ends.

In some embodiments, the switching always switches through an all-I-frame encoded stream.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for providing video playback, comprising:
an interface configured to:
   receive a desired video playback request;
   receive a first video content source switching request from a first video content source to a second video content source;
   receive a second video content source switching request from the second video content source to a third video content source; and
a processor configured to:
   provide a not-all-I-frame first stream for the first video content source;
   generate an all-I-frame second stream and a not-all-I-frame second stream for the second video content source;
   generate an all-I-frame third stream and a not-all-I-frame third stream for the third video content source;
   in response to receiving the first video content source switching request, switch from providing the not-all-I-frame first stream for the first video content source to providing the all-I-frame second stream for the second video content source;

determine whether the second video content source switching request is received when an immediate switch is not possible to a next I-frame occurrence in the not-all-I-frame third stream; and in response to a determination that the second video content source switching request is received when an immediate switch is not possible to the next I-frame occurrence in the not-all-I-frame third stream, switch from providing the all-I-frame second stream for the second video content source to providing the all-I-frame third stream video content source; and in response to a determination that the second video content source switching request is received when an immediate switch is not possible to the next I-frame occurrence in the not-all-I-frame third stream, switch from providing the not-all-I-frame second stream for the second video content source to providing the all-I-frame third stream video content source.

2. The system of claim 1, wherein the not-all-I-frame first stream for the first video content source is generated at multiple bit rates.

3. The system of claim 1, wherein the all-I-frame second stream and the not-all-I-frame second stream for the second video content source are generated at multiple bit rates.

4. The system of claim 1, wherein the not-all-I-frame first stream and the not-all-I-frame second stream have different bit rates.

5. The system of claim 1, wherein the processor is further configured to generate an all-I-frame first stream for the first video content source.

6. The system of claim 5, wherein the processor is further configured to:
switch from the not-all-I-frame first stream for the first video content source at a first bit rate to the all-I-frame first stream for the first video content source at a second bit rate; and
switch from the all-I-frame first stream for the first video content source at the second bit rate to the not-all-I-frame first stream for the first video content source at the second bit rate.

7. The system of claim 6, wherein a bit rate is adjusted automatically based at least in part on an indication of a frame drop rate or a rebuffering rate.

8. The system of claim 6, wherein the second bit rate is higher than the first bit rate.

9. The system of claim 6, wherein the second bit rate is lower than the first bit rate.

10. The system of claim 1, wherein the first video content source and the second video content source comprise different views.

11. The system of claim 10, wherein the first video content source and the second video content source comprise views at different angles.

12. The system of claim 10, wherein the first video content source and the second video content source comprise views highlighting different people.

13. The system of claim 10, wherein the first video content source and the second video content source comprise different views of a live event.

14. The system of claim 1, wherein the processor is further configured to generate the all-I-frame second stream and the not-all-I-frame second stream for the second video content source at all available bit rates.

15. The system of claim 1, wherein the not-all-I-frame first stream, the all-I-frame second stream, and the not-all-I-frame second stream are generated by a set of video encoders operating in parallel.

16. The system of claim 1, wherein all video content sources are associated with a single audio content source.

17. The system of claim 1, wherein the processor is configured to switch from the not-all-I-frame first stream for the first video content source to the all-I-frame second stream for the second video content source with a minimal delay from receiving the video content source switching request from the first video content source to the second video content source.

18. A method for providing video playback, comprising:
receiving a desired video playback request;
receiving a first video content source switching request from a first video content source to a second video content source;
receive a second video content source switching request from the second video content source to a third video content source;
providing, using a processor, a not-all-I-frame first stream for the first video content source;
generating an all-I-frame second stream and a not-all-I-frame second stream for the second video content source;
generating an all-I-frame third stream and a not-all-I-frame third stream for the third video content source;
in response to receiving the first video content source switching request, switching from providing the not-all-I-frame first stream for the first video content source to providing the all-I-frame second stream for the second video content source;
determining whether the second video content source switching request is received when an immediate switch is not possible to a next I-frame occurrence in the not-all-I-frame third stream; and
in response to a determination that the second video content source switching request is received when an immediate switch is not possible to the next I-frame occurrence in the not-all-I-frame third stream, switching from providing the all-I-frame second stream for the second video content source to providing the all-I-frame third stream video content source; and
in response to a determination that the second video content source switching request is received when an immediate switch is not possible to the next I-frame occurrence in the not-all-I-frame third stream, switching from providing the not-all-I-frame second stream for the second video content source to providing the all-I-frame third stream video content source.

19. A computer program product for providing video playback, the computer program product being embodied in a non-transitory computer readable storage medium and comprising computer instructions for:
receiving a desired video playback request;
receiving a first video content source switching request from a first video content source to a second video content source;
receive a second video content source switching request from the second video content source to a third video content source;
providing, a not-all-I-frame first stream for the first video content source;
generating an all-I-frame second stream and a not-all-I-frame second stream for the second video content source;
generating an all-I-frame third stream and a not-all-I-frame third stream for the third video content source;
in response to receiving the first video content source switching request, switching from providing the notall-I-frame first stream for the first video content source to providing the all-I-frame second stream for the second video content source;

determining whether the second video content source switching request is received when an immediate switch is not possible to a next I-frame occurrence in the not-all-I-frame third stream; and in response to a determination that the second video content source switching request is received when an immediate switch is not possible to the next I-frame occurrence in the not-all-I-frame third stream, switching from providing the all-I-frame second stream for the second video content source to providing the all-I-frame third stream video content source; and in response to a determination that the second video content source switching request is received when an immediate switch is not possible to the next I-frame occurrence in the not-all-I-frame third stream, switching from providing the not-all-I-frame second stream for the second video content source to providing the all-I-frame third stream video content source.

\* \* \* \* \*